Figure 1:
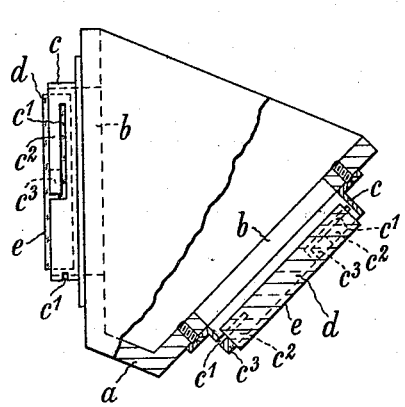

P. NICHTERLEIN.
OPTICAL SQUARE.
APPLICATION FILED AUG. 8, 1921.

1,430,316.

Patented Sept. 26, 1922.

Inventor:
Paul Nichterlein

Patented Sept. 26, 1922.

1,430,316

UNITED STATES PATENT OFFICE.

PAUL NICHTERLEIN, OF JENA, GERMANY, ASSIGNOR TO THE FIRM CARL ZEISS, OF JENA, GERMANY.

OPTICAL SQUARE.

Application filed August 8, 1921. Serial No. 490,723.

(GRANTED UNDER THE PROVISIONS OF THE ACT OF MARCH 3, 1921, 41 STAT. L., 1313.)

*To all whom it may concern:*

Be it known that I, PAUL NICHTERLEIN, a citizen of the German Empire, residing at Jena, Germany, have invented a new and useful Optical Square (for which I have filed an application in Germany April 19, 1918, and in Spain February 23, 1921), of which the following is a specification.

The present invention relates to an optical square consisting of two silvered glass plates, united by an intermediate member. The object pursued by the invention consists in the solution of the well-known task of designing the optical square in such a way that the alterations, caused by any influences of temperature, of the relative inclination of the two glass plates can only be negligible. According to the invention the said object is attained by fixing each of the two glass plates at at least three places by means of a spring to the intermediate member so that the point of application of the spring at the plate can substantially only move towards the intermediate member in the plane of the reflecting surface of the plate. Owing to this kind of fastening the plate can carry out towards the intermediate member those motions which are necessary, if by any changes of temperature the plate is not to bend, and yet it is rendered impossible that the inclination of the two plates towards the intermediate member and thereby also the relative inclination of the two plates is changed. The possibility of carrying out motions of the said kind, must exist even, if the coefficient of expansion of the reflecting plates be equal to that of the intermediate member, because already on account of the generally prevailing difference of the thermal conductivity of the reflecting plates on the one hand and of the intermediate member on the other hand, differences of temperature of the single parts of the optical square must be expected.

The intermediate member is suitably made of metal in order to impart to it a comparatively high thermal conductivity and thereby to attain a quick adjustment of any possible differences of temperature in it; it may then be relied upon that in case of changes of temperature the intermediate member changes its size but not its shape.

The new optical square becomes particularly resistive by composing it of as few single parts as possible, and by avoiding, when uniting the single parts, such means (e. g., bolted joints) as are liable to loosen in case of concussions. The said property of the optical square can be attained by making the intermediate member itself and the springs of one piece and by cementing the glass plates to the springs.

Figure 2:
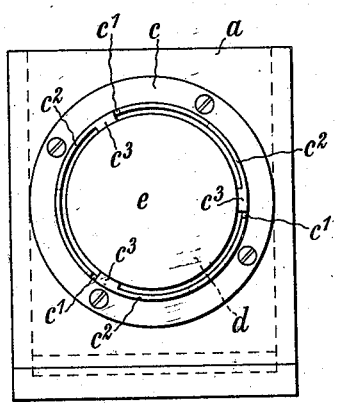
Figure 3:
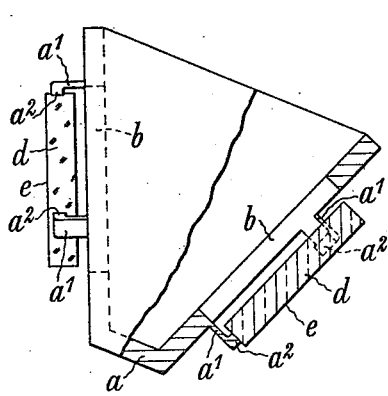
Figure 4:
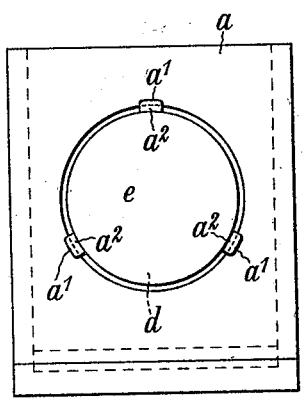

The annexed drawing shows two constructional examples of the invention. Figs. 1 and 3 represent a front view each, partially in section; Figs. 2 and 4 show a front view each.

In the first example shown in Figs. 1 and 2, a metal casing $a$ is provided with two openings $b$. Behind each of the latter a metal ring $c$ is screwed to the casing which ring is provided at three places with a hook-shaped incision $c^1$ so that three spring tongues $c^2$ result. Each of these is reinforced at its end by an extension $c^3$, and to the said three extensions a glass plate $d$ is cemented which carries a silvering $e$ on its back. If, owing to a change of temperature, the casing $a$ is, e. g., enlarged without a simultaneous, corresponding increase of the diameter of the plates $d$, the tongues $c^2$ bend inwardly. Even if this bending should not reach the same amount with all three tongues of a ring, the resulting inclination of the respective glass plate towards its original position would be so small as to be of no detrimental effect.

In the second example shown in Figs. 3 and 4, $a$ again represents a metal casing provided with two openings $b$. At the margin of each of the latter there are three spring-tongues $a^1$ which together with the casing $a$ consist of one piece and which are reinforced each at the end by an extension $a^2$, made together with them of one piece. To the said extensions a glass plate $d$ is again cemented, carrying a silvering $e$ on its back. With regard to its mode of action the second example corresponds to the first one.

I claim:

1. In an optical square composed of two silvered glass plates and an intermediate member connecting the said plates, springs connecting the said glass plates in at least three places to the said intermediate member, the said springs being yielding only in a plane parallel to the plane of the reflecting surface of the plate.

2. In an optical square composed of two silvered glass plates and an intermediate member connecting the said plates, springs connecting the said glass plates in at least three places to the said intermediate member, the said springs being yielding only in a plane parallel to the plane of the reflecting surface of the plate, the said intermediate member and the said springs consisting of one piece and the said glass plates being cemented to the said springs.

PAUL NICHTERLEIN.

Witnesses:
    PAUL KRUGER,
    RICHARD HAHN.